United States Patent
Oonuma

(10) Patent No.: US 7,031,008 B2
(45) Date of Patent: Apr. 18, 2006

(54) IMAGE FORMING APPARATUS AND METHOD OF CONTROLLING THE APPARATUS

(75) Inventor: Kazuto Oonuma, Tokyo (JP)

(73) Assignees: Kabushiki Kaisha Toshiba, Tokyo (JP); Toshiba Tec Kabushiki Kaisha, Tokyo (JP)

( * ) Notice: Subject to any disclaimer, the term of this patent is extended or adjusted under 35 U.S.C. 154(b) by 949 days.

(21) Appl. No.: 10/025,568

(22) Filed: Dec. 26, 2001

(65) Prior Publication Data

US 2003/0117663 A1 Jun. 26, 2003

(51) Int. Cl.
*H04N 1/00* (2006.01)
*H04N 1/10* (2006.01)
*H04N 1/387* (2006.01)
*H04N 1/41* (2006.01)

(52) U.S. Cl. .............. 358/1.15; 358/401; 358/402; 358/403; 358/474; 709/206; 709/203; 399/23

(58) Field of Classification Search ............. 358/1.15, 358/1.16
See application file for complete search history.

(56) References Cited

U.S. PATENT DOCUMENTS

| 4,734,747 A | * | 3/1988 | Okuda et al. .............. 399/23 |
| 6,208,426 B1 | * | 3/2001 | Saito et al. .............. 358/1.15 |
| 6,457,044 B1 | * | 9/2002 | IwaZaki .............. 709/206 |
| 6,775,688 B1 | * | 8/2004 | Kakimoto .............. 709/203 |

FOREIGN PATENT DOCUMENTS

JP 2001-217876 8/2001

* cited by examiner

*Primary Examiner*—Kimberly Williams
*Assistant Examiner*—Anil K. Jain
(74) *Attorney, Agent, or Firm*—Foley & Lardner LLP

(57) ABSTRACT

When an E-mail address is inputted, it is judged whether the E-mail address is an address registered in advance. If this judgment result is positive, an image read by a scan section is stored in a server 111, and an E-mail, with a URL indicating a location of the stored image, addressed to the E-mail address is generated. If the judgment result is negative, an E-mail addressed to the E-mail address and with an image read by the scan section is generated. The generated E-mail is transmitted.

18 Claims, 5 Drawing Sheets

E-mail

URL

FIG. 7

E-mail

Image data

FIG. 8

IMAGE FORMING APPARATUS AND METHOD OF CONTROLLING THE APPARATUS

BACKGROUND OF THE INVENTION

An image forming apparatus optically reads an image of a document set on a document table, and prints the read image on a sheet of paper.

In such an image forming apparatus, it is convenient if an image read from a document can be sent to an external apparatus (such as a personal computer).

BRIEF SUMMARY OF THE INVENTION

An image forming apparatus according to a first aspect of the present invention is aimed at enabling sending of an image, read from a document, to the outside.

An image forming apparatus according to a first aspect of the present invention comprises:

a document table configured to set a document thereon;

a scan section configured to optically read an image of the document set on the document table;

an input section configured to input an E-mail address;

a judging section configured to judge whether the E-mail address inputted by the input section is an address registered in advance;

a storing section configured to store the image read by the scan section if the judgment result of the judging section is positive;

a first generating section configured to generate an E-mail having the E-mail address inputted by the input section as its destination address, and with a URL indicating a location of the stored image, if the judgment result of the judging section is positive;

a second generating section configured to generate an E-mail having the E-mail address inputted by the input section as its destination address, and with the image read by the scan section, if the judgment result of the judging section is negative; and a transmitting section configured to transmit the E-mails generated in the respective generating sections.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIG. 7 is a diagram showing a format of an E-mail of the embodiment to which a URL is attached.

FIG. 8 is a diagram showing a format of an E-mail of the embodiment to which image data is attached.

DETAILED DESCRIPTION OF THE INVENTION

An embodiment of the present invention will now be described with reference to the drawings.

Figure 1:
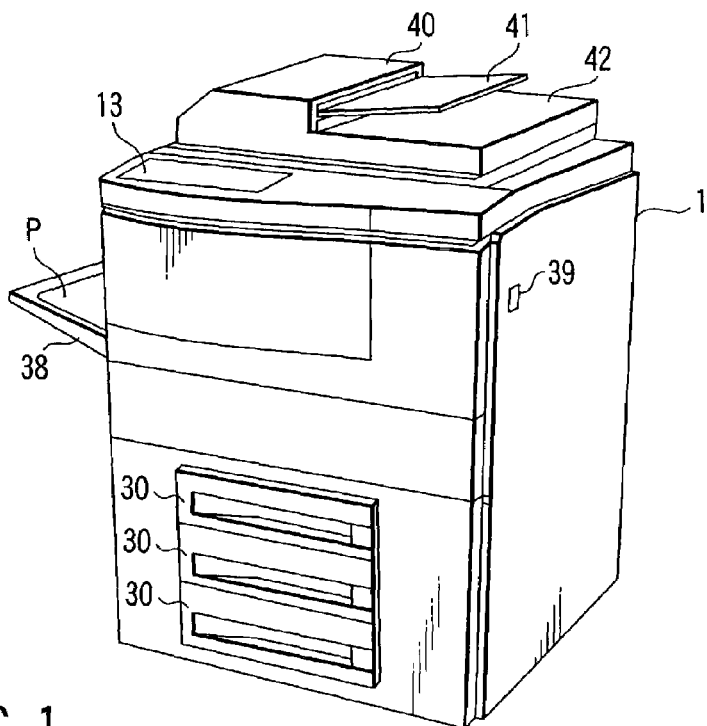
FIG. 1 is a diagram showing the appearance of an embodiment.
Figure 2:
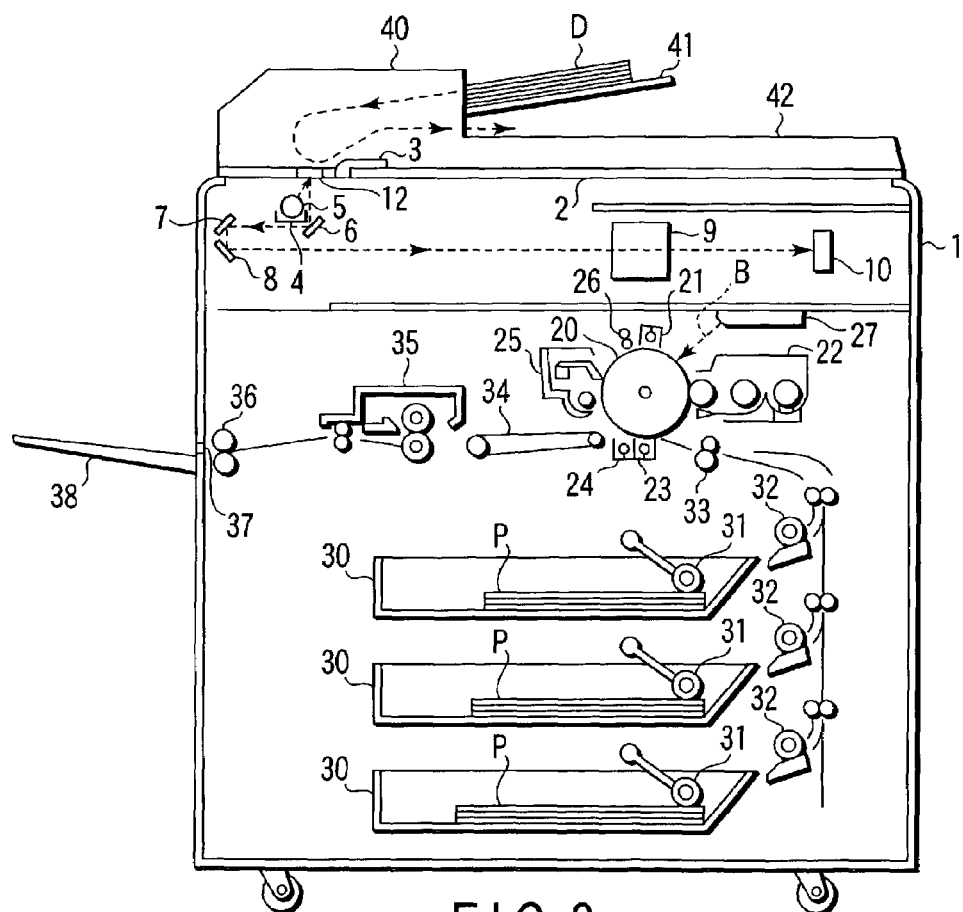
FIG. 2 is a diagram showing the internal structure of the embodiment.

As shown in FIG. 1 and FIG. 2, a transparent document table (glass panel) 2 for setting a document thereon is provided on an upper surface portion of a main body 1. An indicator 3 is provided on one side portion of the document table 2. A portion of difference in level between the indicator 3 and the document table 2 serves as a reference position for setting a document.

Figure 4:
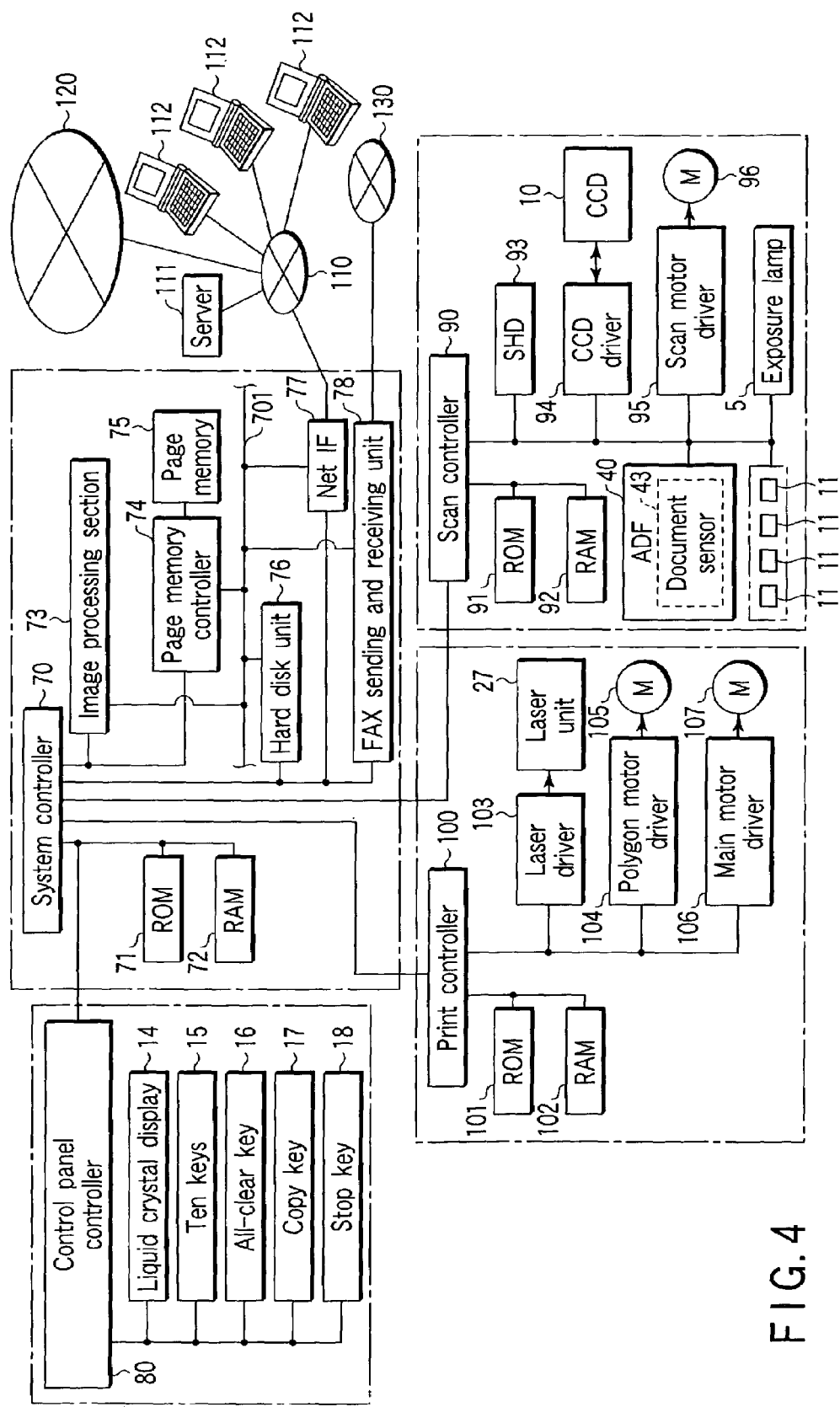
FIG. 4 is a block diagram showing a control circuit of the embodiment.

A plurality of document sensors 11 that are shown in FIG. 4 are arranged on a lower surface side of the document table 2. The document sensors 11 optically sense the presence/absence and the size of document D set on the document table 2.

A carriage 4 is provided on the lower surface side of the document table 2, and an exposure lamp 5 is provided on a carriage 4. The carriage 4 and exposure lamp 5 constitute exposure means. The carriage 4 can move (reciprocate) along the lower surface of the document table 2. The document D set on the document table 2 is exposed to light by turning on the exposure lamp 5 while the carriage 4 reciprocates along the document table 2.

By this exposure, a reflected light image from the document D is obtained, and is projected onto a CCD (charge-coupled device) 10 by reflecting mirrors 6, 7 and 8 and a variable-power lens block 9. The CCD 10 has a number of photo-electric conversion elements in its light-receiving region, and outputs an image signal corresponding to the image of the document D, by being subjected to repeated line-scanning on the light receiving region.

The image signal outputted from the CCD 10 is amplified and converted into a digital signal, and the digital signal is suitably processed by an image processing section 73 that is shown in FIG. 4, and then supplied to a laser unit 27. The laser unit 27 emits a laser beam B corresponding to the input signal.

A window 12 for reading the document therethrough is provided at a position adjacent to the indicator 3 of the document table 2. The window 12 has a size and form corresponding to the longitudinal length of the indicator 3.

An auto document feeder (hereinafter abbreviated to "ADF") 40, also serving as a document table cover, is provided over the document table 2, indicator 3 and window 12 so as to be openable/closable. The ADF 40 has a tray 41 for setting a document thereon, feeds documents D set on the tray 41 one by one to the window 12 so that each of the documents passes over the window 12, and discharges each of the passed documents D to a tray 42. When the ADF 40 operates, the exposure lamp 5 emits light at a position corresponding to the window 12, and the light is irradiated to the window 12. Each of the documents D passing over the window 12 is exposed to the light irradiated to the window 12 through the window 12.

By this exposure, a reflected light image from each of the documents D is obtained, and is projected onto the CCD 10 by the reflecting mirrors 6, 7 and 8 and variable-power lens block 9.

Figure 3:
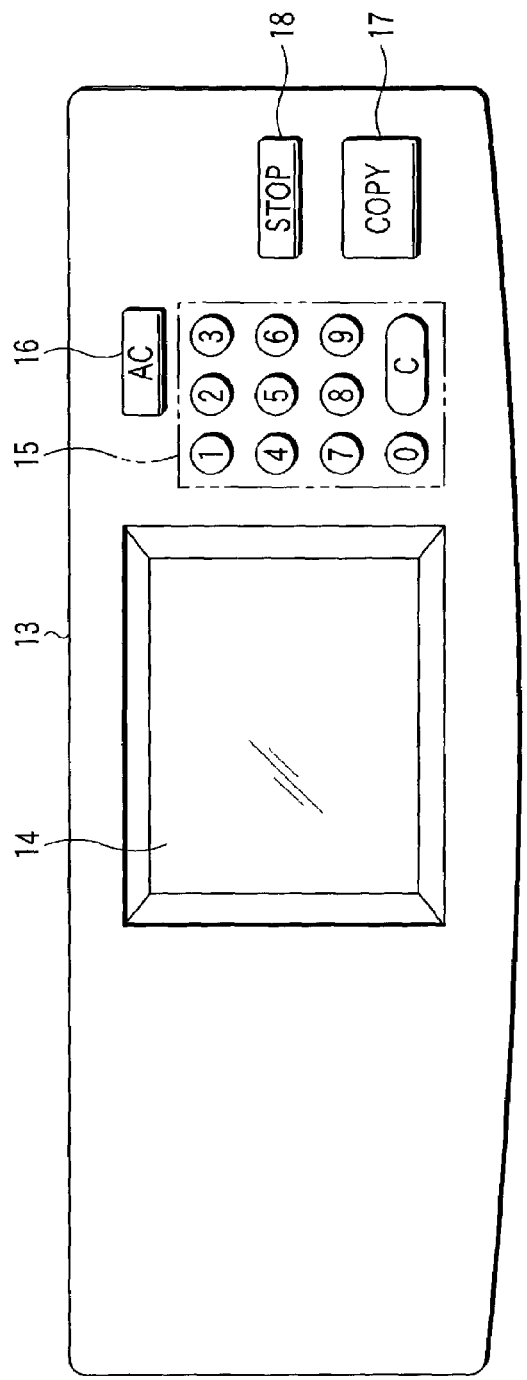
FIG. 3 is a diagram showing a control panel of the embodiment.

In the upper surface portion of the main body 1, a control panel 13 for setting operation conditions is provided at a position not covered with the ADF 40. As shown in FIG. 3, the control panel 13 comprises a liquid crystal display 14 of a touch-panel type, ten keys 15 for inputting numerical values, an all-clear key 16, a copy key 17, and a stop key 18. An operator can input data (including an E-mail address) by touching the liquid crystal display 14. The liquid crystal display 14 can display the inputted data, and thus functions as an input section for inputting an E-mail address.

In the meantime, a photosensitive drum 20 is rotatably provided in an approximately central portion in the main body 1. A charging unit 21, a developing unit 22, a transferring unit 23, a separating unit 24, a cleaner 25, and a discharging unit 26 are successively arranged around the photosensitive drum 20. Further, laser beam B, which is emitted from the laser unit 27, is irradiated onto a surface of the photosensitive drum 20 through a space between the charging unit 21 and the developing unit 22.

At a bottom portion of the main body 1, a plurality of paper cassettes 30 are provided as a paper storing section. A number of sheets of copying paper P being different in size are stored in the paper cassettes 30. When the copy key 17 is pressed, copying paper P is taken out sheet by sheet from any one of the paper cassettes 30. A pick-up roller 31 is provided for each of the paper cassettes, as a taking out section for taking out paper.

Each of the taken-out sheet of copying paper P is separated from the paper cassette 30 by a separating unit 32, and sent to a resist roller 33. The resist roller 33 feeds the copy paper P between the photosensitive drum 20 and the transferring unit 23, at a timing in consideration of rotation of the photosensitive drum 20.

The charging unit 21 charges the surface of the photosensitive drum 20 with an electrostatic charge, by applying a high voltage to the photosensitive drum 20. Laser beam B emitted from the laser unit 27 is irradiated onto the charged surface of the photosensitive drum 20. The laser unit 27 forms an electrostatic latent image corresponding to the image read from the document D on the surface of the photosensitive drum 20, by main-scanning (line-scanning) the beam on the surface of the photosensitive drum 20 in one direction, and sub-scanning a beam thereon for repeating the main scanning with rotation of the photosensitive drum 20.

The electrostatic latent image on the photosensitive drum 20 is made visible by receiving a developer (toner) at the developing unit 22. The visible image is transferred onto a copying paper sheet P by the transferring unit 23. The copying paper sheet P onto which the visible image has been transferred is separated from the photosensitive drum 20 by the separating unit 24. The developer and electric charge remain on the surface of the photosensitive drum 20 from which the sheet of copying paper P has been separated. The remaining developer is removed by the cleaner 25. The remaining charge is removed by the discharging unit 26.

The sheet of copying paper P which has been separated from the photosensitive drum 20 is sent to a fixing unit 35 by a carrier belt 34. The fixing unit 35 fixes the transferred image onto the sheet of copying paper P by heat. The fixed copying paper P is sent to an outlet 37 by a delivery roller 36, and discharged from the outlet 37 to a tray 38 outside the main body 1.

A power switch 39 is provided on the other side surface of the main body 1.

FIG. 4 shows a control circuit of the apparatus.

A control panel controller 80, a scan controller 90, and a print controller 100 are connected to a system controller 70. The system controller 70 performs centralized control of the control panel controller 80, scan controller 90 and print controller 100, and comprises a copy-mode control section to correspond to operation of the copy key 17, a printer mode control section for controlling a printer mode to correspond to an image input from outside to a net interface 77 described below, and a facsimile mode (FAX mode) control section for controlling a facsimile mode to correspond to images received by a FAX sending and receiving unit 78.

Further, a ROM 71 for storing a control program, a RAM 72 for storing data, an image processing section 73, page memory controller 74, hard disk unit 76, the net interface 77, and the FAX sending and receiving unit 78 are connected to the system controller 70. The page memory controller 74 controls reading and writing of image data to a page memory 75. Further, an image data bus 701 interconnects the image processing section 73, the page memory controller 74, the hard disk unit 76, the net interface 77, and the FAX sending and receiving unit 78.

The net interface 77 functions as an input section for the printer mode, into which data (image data) transmitted from an external apparatus is inputted, and as an output section for a transmission mode for transmitting data (image data) read in the main body 1. A network, such as a LAN 110, is connected to the net interface 78. External apparatuses, such as a server 111 and a plurality of personal computers 112, are connected to the LAN 110, as well as the Internet 120.

The FAX sending and receiving unit 78 is connected to a telephone line 130, and functions as a receiving section for the facsimile mode, for receiving an image (image data) transmitted by fax through the telephone line 130.

The liquid crystal display 14, ten keys 15, all-clear key 16, copy key 17, and stop key 18 are connected to the control panel controller 80.

Connected to the scan controller 90 are a ROM 91 for storing a control program, a RAM 92 for storing data, a shading correction section (SHD) 93, a CCD driver 94, a scan motor driver 95, the exposure lamp 5, and ADF 40, and the plurality of document sensors 11, etc. The CCD driver 94 drives the CCD 10. The scan motor driver 95 drives a scan motor 96 for driving the carriage. The ADF 40 has a document sensor 43 for sensing a document D set on the tray 41 and the size of the document.

The scan controller 90 mainly composes a scan section for a copy mode, which optically reads an image of the document D.

A ROM 101 for storing a control program, a RAM 102 for storing data, a laser driver 103, a polygon motor driver 104, and a main motor driver 106 are connected to the print controller 100. The laser driver 103 drives the laser unit 27. The polygon motor driver 104 drives the polygon mirror motor for scanning the laser beam B onto the photosensitive drum 20. The main motor driver 106 drives the main motor 107 which is the driving source of the photosensitive drum 20 and paper carriage mechanism, etc.

The print controller 100 mainly composes a print section for printing an image read by the scan section, an image inputted from outside into the net interface 78, and an image received by the FAX sending and receiving unit 79, on the sheet of copying paper P of the paper cassettes 30.

Figure 5:
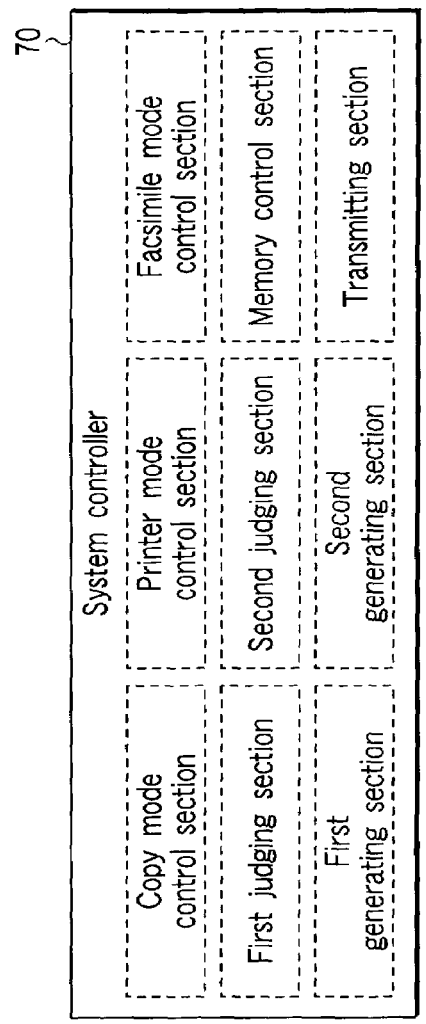
FIG. 5 is a diagram showing the main functions of the system controller of FIG. 4.

Further, as shown in FIG. 5, the system controller 70 has the following sections (1)–(6), together with the control section for the copy mode, the control section for printer mode, and the control section for facsimile mode, as main functions.

(1) A first judging section for judging whether an E-mail address inputted by the control panel 13 is an address registered in advance in an internal memory as an object of security control.

(2) A second judging section for judging, in the case where the judgment result of the first judgment section is negative, whether the E-mail address inputted by the control panel 13 is an address registered in advance in the internal memory as an object of reporting a URL.

(3) A memory control section for storing, if the judgment result of the first judgment section is positive, an image (image data) read by the scan section in the server 111.

(4) A first generating section for generating an E-mail addressed to the E-mail address inputted by the control panel 13 and with a URL (uniform resource locator) indicating a location of the image (image data) stored in the server 111, if the judgment result of the first judgment section is positive or the judgment result of the second judgment section is positive.

(5) A second generating section for generating an E-mail, with the image (image data) read by the scan section, addressed to the E-mail address inputted by the control panel 13, if the judgment result of the second judgment section is negative.

(6) A transmitting section for transmitting the E-mail generated by each of the generating sections to the outside via the net interface 77.

Figure 6:
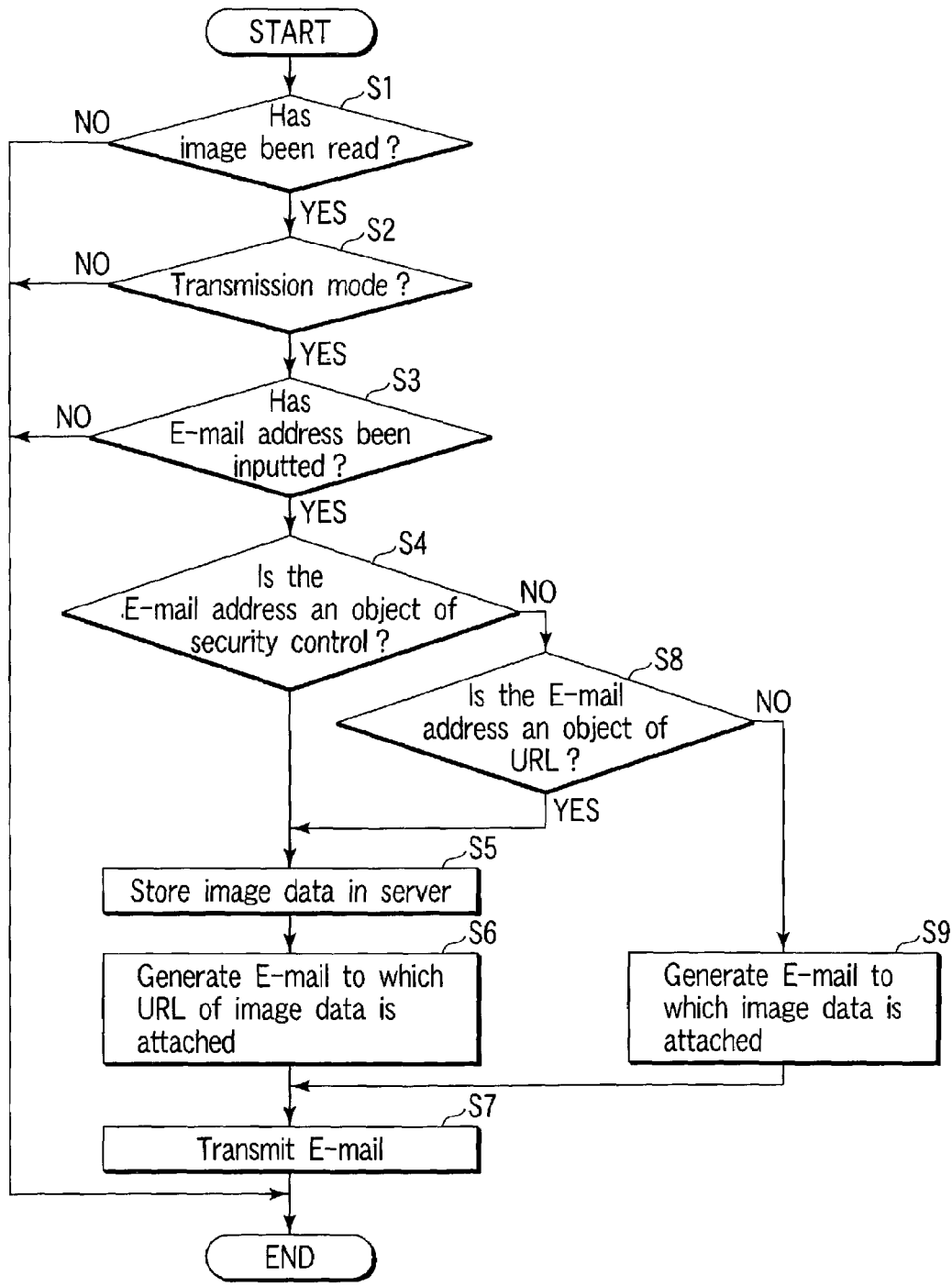
FIG. 6 is a flow chart for explaining an operation of the embodiment.

Next, the operation of the apparatus will now be described with reference to the flow chart of FIG. 6.

When a document D is set on the document table 2, each of the document sensors 11 senses the setting state and the size of the document D. Then, when the copy key 17 is pressed, an image of the document D on the document table 2 is read ("YES" of step S1).

At this time, if a transmission mode has been set by the control panel 13 ("YES" of step S2) and an E-mail address has been inputted by the control panel 13 ("YES" of step S3), it is judged whether the inputted E-mail address has been registered in advance as an object of security control (step S4).

Figures 7, 8:
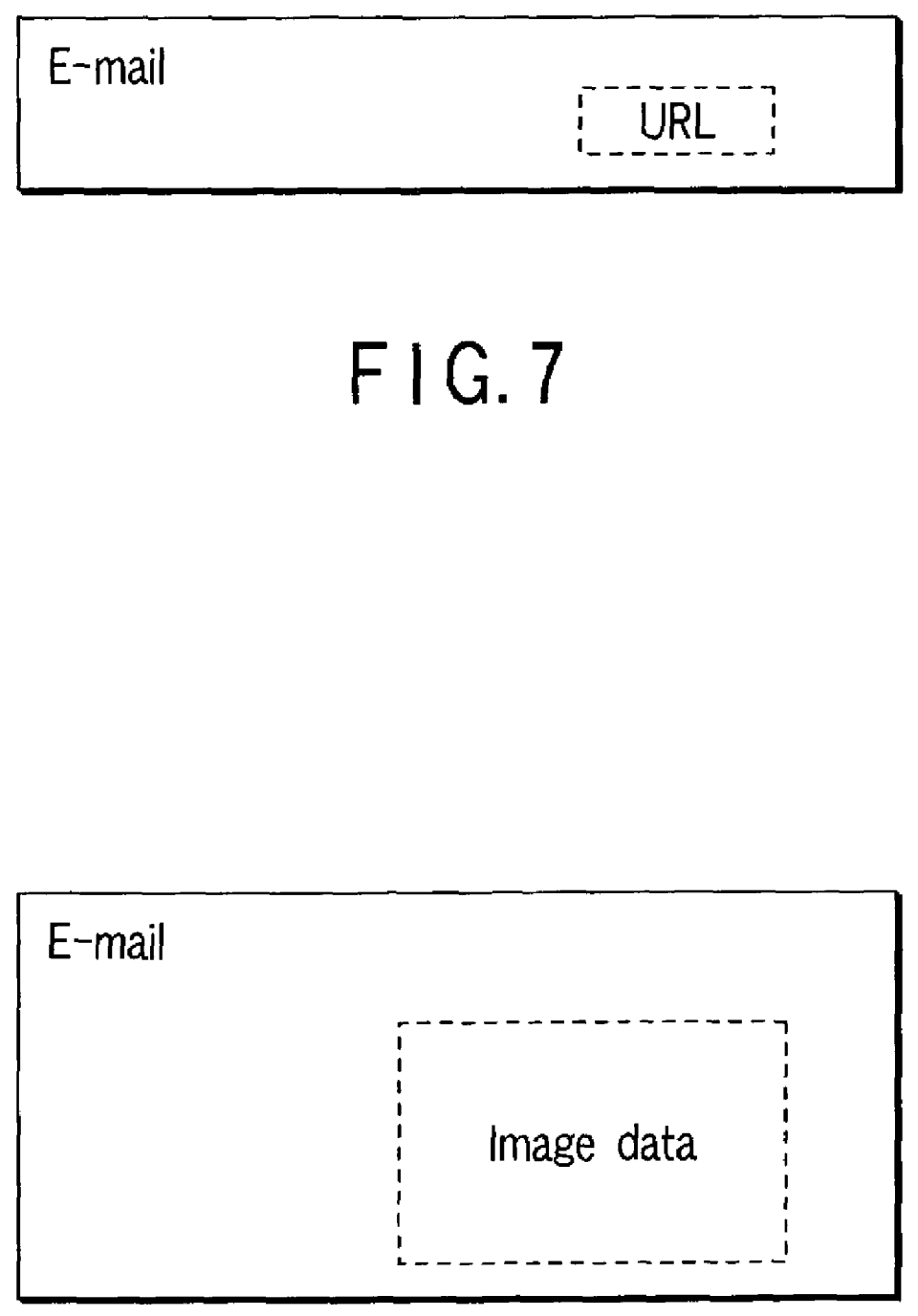

If the inputted E-mail address has been registered in advance as an object of security control ("YES" of step S4), the image (image data) read by the scan section is stored in the server 111 on the LAN 111 (step S5). Then, as shown in FIG. 7, an E-mail addressed to the inputted E-mail address and including a URL indicating the location of the image (image data) stored in the server 111, is generated (step S6). The generated E-mail is transmitted to the server 111 on the LAN 110, for example (step S7).

The transmitted E-mail is captured by a personal computer 112 of a specific user via the server 111. The captured E-mail is opened on the personal computer 112. Thereby, the URL attached to the E-mail is displayed on a display of the personal computer 112.

The user of the personal computer 112 can capture the image (image data) stored in the server 111 into his/her personal computer 112, by accessing the displayed URL. The captured image is displayed on the display of the personal computer 112. The displayed image can be printed on paper sheets by a printer attached to the personal computer 112.

As described above, the URL is reported to users having respective E-mail addresses registered in advance as objects of security control, since no problem of security occurs if the URL is reported to them. The load of the server 111 is lightened, since the server 111 deals with E-mails having a smaller data amount. Lightening of the load prevents errors in transferring E-mails from the server 111 to the personal computers 112.

In the meantime, if the inputted E-mail address has not been registered in advance as an object of security control ("NO" of step S4), it is judged whether the inputted E-mail address has been registered in advance as an object of the URL (step S8).

If the inputted E-mail address has not been registered in advance as an object of the URL ("NO" of step S8), an E-mail addressed to the inputted E-mail address and with the image (image data) read by the scan section, as shown in FIG. 8, is generated as shown in FIG. 8 (step S9). Further, the generated E-mail is transmitted to the server 111 on the LAN 110, for example (step S7).

The transmitted E-mail is captured by a personal computer 112 of a specific user via the server 111. The captured E-mail is opened on the personal computer 112. Thereby, the image (image data) attached to the E-mail is displayed on the display of the personal computer 112.

The displayed image can be printed on paper sheets by a printer attached to the personal computer 112.

As described above, not the URL but the read image is transmitted to users having respective E-mail addresses which have not been registered in advance as objects of security control, since reporting the URL to these users causes a security risk.

Further, the URL is reported to users having respective E-mail addresses registered in advance as objects for reporting the URL ("YES" of step S8), as an exception (steps S5, S6 and S7).

Additional advantages and modifications will readily occur to those skilled in the art. Therefore, the invention in its broader aspects is not limited to the specific details and representative embodiment shown and described herein. Accordingly, various modifications may be made without departing from the spirit or scope of the general inventive concept as defined by the appended claims and their equivalents.

What is claimed is:

1. An image forming apparatus comprising:
   a document table configured to set a document thereon;
   a scan section configured to optically read an image of the document set on said document table;
   an input section configured to input an E-mail address;
   a judging section configured to judge whether the E-mail address inputted by said input section is an address registered in advance;
   a storing section configured to store the image read by said scan section if the judgment result of said judging section is positive;
   a first generating section configured to generate an E-mail having the E-mail address inputted by said input section as its destination address, and with a URL indicating a location of the stored image, if the judgment result of said judging section is positive;
   a second generating section configured to generate an E-mail having the E-mail address inputted by said input section as its destination address, and with the image read by said scan section, if the judgment result of said judging section is negative; and
   a transmitting section configured to transmit the E-mails generated in said respective generating sections.

2. The apparatus according to claim 1, wherein said storing section is a server which is connected to said apparatus via a network.

3. The apparatus according to claim 1, wherein the URL indicates a location of the stored image.

4. The apparatus according to claim 1, wherein said judging section comprises: a first judging section configured to judge whether the E-mail address inputted by said input section has been registered in advance as an object of security control; and a second judging section configured to judge whether the E-mail address inputted by said input section has been registered in advance as an object of reporting the URL, if a judgment result of said first judging section is negative, wherein said storing section stores the image read by said scan section, if the judgment result of said first judging section is positive, wherein said first generating section generates an E-mail having the E-mail address inputted by said input section as its destination address, and with a URL indicating a location of the stored image, if the judgment result of said first judging section is positive or the judgment result of said second judging section is positive, and wherein said second generating section generates an E-mail having the E-mail address inputted by said input section as its destination address, and with the image read by said scan section, if the judgment result of said second judging section is negative.

5. The apparatus according to claim 1, further comprising:
a paper storing section configured to store copying paper;
a taking out section configured to take out the copying paper in said paper storing section; and
a print section configured to print the image read by said scan section on the copying paper taken out by said taking out section.

6. The apparatus according to claim 1, further comprising:
a paper storing section configured to store copying paper;
a taking out section configured to take out the copying paper in said paper storing section;
a printer-mode capturing section configured to capture an image transmitted from an external apparatus; and
a print section configured to print the image read by said scan section and the image captured by said capturing section on the copying paper taken out by said taking out section.

7. The apparatus according to claim 1, further comprising:
a paper storing section configured to store copying paper;
a taking out section configured to taking out the copying paper in said paper storing section;
a printer-mode capturing section configured to capture an image transmitted from an external apparatus;
a facsimile-mode receiving section configured to receive a faxed image; and
a print section configured to print the image read by said scan section, the image captured by said capturing section, and the image received by said receiving section on the copying paper taken out by said taking out section.

8. The apparatus according to claim 4, further comprising:
a paper storing section configured to store copying paper;
a taking out section configured to taking out the copying paper in said paper storing section; and
a print section configured to print the image read by said scan section on the copying paper taken out by said taking out section.

9. The apparatus according to claim 4, further comprising:
a paper storing section configured to store copying paper;
a taking out section configured to taking out the copying paper in said paper storing section;
a printer-mode capturing section configured to capture an image transmitted from an external apparatus; and
a print section configured to print the image read by said scan section and the image captured by said capturing section on the copying paper taken out by said taking out section.

10. The apparatus according to claim 4, further comprising:
a paper storing section configured to store copying paper;
a taking out section configured to taking out the copying paper in said paper storing section;
a printer-mode capturing section configured to capture an image transmitted from an external apparatus;
a facsimile-mode receiving section configured to receive a faxed image; and
a print section configured to print the image read by said scan section, the image captured by said capturing section, and the image received by said receiving section on the copying paper taken out by said taking out section.

11. An image forming apparatus comprising:
a document table for setting a document thereon;
scan means for optically reading an image of the document set on said document table;
input means for inputting an E-mail address;
judging means for judging whether the E-mail address inputted by said input means is an address registered in advance;
storing means for storing the image read by said scan means if the judgment result of said judging means is positive;
first generating means for generating an E-mail having the E-mail address inputted by said input means as its destination address, and with a URL indicating a location of the stored image, if the judgment result of said judging means is positive;
second generating means for generating an E-mail having the E-mail address inputted by said input means as its destination address, and with the image read by said scan means, if the judgment result of said judging means is negative; and
transmitting means for transmitting the E-mails generated in said respective generating means.

12. The apparatus according to claim 11, wherein said storing means is a server which is connected to the apparatus via a network.

13. The apparatus according to claim 11, wherein the URL indicates a location of the stored image.

14. The apparatus according to claim 11, wherein said judging means comprises: a first judging means for judging whether the E-mail address inputted by said input means has been registered in advance as an object of security control; and a second judging means for judging whether the E-mail address inputted by said input means has been registered in advance as an object of reporting the URL, if the judgment result of said first judging means is negative, wherein said storing means stores the image read by said scan means, if the judgment result of said first judging means is positive, wherein said first generating means generates an E-mail having the E-mail address inputted by said input means as its destination address, and with a URL indicating a location of the stored image, if the judgment result of said first judging means is positive or the judgment result of said second judging means is positive, and wherein said second generating means generates an E-mail having the E-mail address inputted by said input means as its destination address, and with the image read by said scan means, if the judgment result of said second judging means is negative.

15. The apparatus according to claim 11, further comprising:

paper storing means for storing copying paper;

taking out means for taking out the copying paper in said paper storing means; and print means for printing the image read by said scan means on the copying paper taken out by the taking out means.

16. The apparatus according to claim 11, further comprising:

paper storing means for storing copying paper;

taking out means for taking out the copying paper in said paper storing means;

printer-mode capturing means for capturing an image transmitted from an external apparatus; and print means for printing the image read by said scan means and the image captured by said capturing means on the copying paper taken out by said taking out means.

17. The apparatus according to claim 11, further comprising:

paper storing means for storing copying paper;

taking out means for taking out the copying paper in said paper storing means;

printer-mode capturing means for capturing an image transmitted from an external apparatus;

facsimile-mode receiving means for receiving a faxed image; and print means for printing the image read by said scan means, the image captured by the capturing means, and the image received by said receiving means on the copying paper taken out by said taking out means.

18. A method of controlling an image forming apparatus, the image forming apparatus having:

a document table which sets a document thereon;

a scan section which optically reads an image of the document set on the document table;

a print section which prints the image read by the scan section on copying paper, the method comprising:

judging whether an inputted E-mail address is an address registered in advance;

storing the image read by said scan section, if a result of the judging is positive;

generating an E-mail having the inputted E-mail address as its destination address, and with a URL indicating a location of the stored image, if the result of the judging is positive;

generating an E-mail having the inputted E-mail address as its destination address, and with the image read by said scan section, if the result of the judging section is negative; and transmitting the generated E-mails.

* * * * *